Patented Sept. 29, 1942

2,297,539

UNITED STATES PATENT OFFICE 2,297,539

POROUS CERAMIC ARTICLES AND METHOD OF MAKING THE SAME

Grant S. Diamond, Hamburg, N. Y., assignor to Electro Refractories & Alloys Corporation, Buffalo, N. Y.

No Drawing. Application May 31, 1938, Serial No. 211,043

8 Claims. (Cl. 106—71)

This invention relates to porous ceramic materials such, for example, as tile or conduit, usable for aeration and filtration of liquids.

One of the objects of this invention is to provide a porous ceramic article of this kind which can be produced at a relatively low cost and which can be more readily cleaned. It is also an object of this invention to produce a material of this kind of relatively light weight, and strong enough to withstand the forces to which it may be subjected in use. A further object is to produce a material of this kind which is more resistant to acids of the kind commonly used for cleaning such materials than tile heretofore made.

Further objects of this invention are to produce a material of this kind formed of a hard, dense granular burned clay product bonded with a clay and a flux which vitrifies at a temperature below that at which the granular product was burned. Also to provide an article of this kind in which the bond forms a glassy envelope about the granular particles without changing the nature of the particles. Another object is to provide a material of this type in which the bond which envelops and joins the particles is resistant to acids and is present in quantities insufficient to fill the spaces between the particles, to form an intercommunicating pore structure. Also to provide an article of this type in which the particles of granular material are bonded and encased in a bond formed of a mixture of a clay and litharge.

It is also an object of this invention to provide an improved method for producing an article of this type.

Other objects of this invention will appear from the following description and claims.

Heretofore tile and other articles of this kind have generally been made of fused alumina. This material is relatively expensive and is also attacked by acids, such as are commonly used in cleaning articles of this nature, particularly hydrochloric acid and mixtures of hydrochloric and sulfuric acids.

In accordance with this invention, I employ grains of the desired sizes and of any suitable refractory material, but preferably these grains are made of an aluminum silicate clay of the type commonly employed in the making of fire brick and the like, such for example as flint clay or ball clay. This clay is fired at comparatively high temperatures, preferably in the neighborhood of about 2750° F. to sinter the same, and after sintering, the resulting product is crushed and screened. By properly selecting the sizes of the crushed clay material, the porosity of the final product can be controlled to a considerable extent. In screening the crushed clay material, the very fine particles should be discarded, since they tend to close the pores formed between the larger particles, and the very large or coarse particles should also be discarded. By using finer particles, the permeability of the finished articles is decreased, while the use of coarser particles in general increases the porosity of the articles and their permeability.

As an alternative, my improved porous bodies may be made of a grain produced by crushing ordinary fire brick. Such brick is generally burned at temperatures below 2500° F. and for many purposes, diffuser or filtration tile of a very satisfactory type may be made by the use of crushed fire brick screened to the desired sizes. Preferably, however, the grain is made from new flint or ball clay heated to about 2750° F., at which temperature sintering takes place. Diffuser or filtration tile made from grain of this type is somewhat stronger than that made from unsintered crushed fire brick. The grain or grog produced in either manner consists of very dense hard vitrified clay particles having very little, if any, porosity.

After the grain has been produced by crushing and screening to eliminate the very fine as well as the coarse particles, this grain is then mixed with a suitable bonding material and made into plastic form with water and is molded or pressed into the desired form of the final articles. In accordance with my invention, this bonding material should be such as to fuse and vitrify at temperatures sufficiently low so that the shape or form of the granular material in the articles will not be changed or altered during the firing of the articles. For this purpose, I preferably provide a bond of raw or unburned plastic clay to which has been added a suitable flux. This flux should be of such a nature that the bonding material will form a glass-like bond at temperatures between 1800° F. and about 2300° F. Any suitable or well known flux may be employed for this purpose, such for example as litharge or other oxide of lead, or other metallic oxides, such as the oxides of sodium, potassium, lithium, magnesium, calcium, bismuth or boron or mixtures of these oxides. I prefer to use lead oxide since I have found that the porous tile or other bodies in which the burned clay grain is bonded with the use of litharge is somewhat more acid resisting than similar material when bonded with other metallic oxides.

By the use of a flux in the bonding material, the bonding material can be readily fused so that it will form an envelope of a glassy substance about the grains of the burned clay. By providing a relatively small amount of this bonding material, the particles or grains of the burned clay will be secured together in such a manner as to form an open porous structure in which most of the pores or openings communicate with each other so as to permit fluids to pass through the article. Also by the use of a flux, the final articles can be fired at relatively low temperatures, which prevents the grain or body material from becoming deformed during firing. It is, for example, possible to use a ball clay in the bond, if mixed with a sufficient quantity of flux.

After the bonding material has been mixed with the granular substance together with sufficient water and other materials which it may be desired to add, such as any of the well known air hardening organic bonds, and after it has been aged for a short time, it is formed in any suitable manner into the desired shapes. This may be done by pressing, casting, tamping, ramming, or jolting. The shapes are then dried in any usual manner and are subjected in a kiln to gradually increasing temperatures. The maximum temperatures should be materially below those to which the material from which the granular particles are made was originally subjected. During this firing or burning, the bonding material becomes fused and flows about the particles, forming glassy envelopes or casings around the same. The amount of bonding material employed is sufficiently small so that the crevices or spaces between the particles of granular material are not filled by the bonding material, thus providing for an open or intercommunicating pore structure through which fluids can readily be passed.

The clay used in making the grain or body material is preferably 40 parts alumina and 60 parts silica with about 5 parts of impurities. Clay for this purpose may, however, contain from 30% to 70% of alumina and from 70% to 30% of silica.

A specific example of how this material may be made is herewith given, but it will be understood that this is merely one example of the article and process embodying this invention, and it is not intended to limit the invention to the particular proportions, ingredients and steps specified in this example.

*Example*

The grain used in connection with the making of these articles is produced preferably by heating new flint or plastic clay to a temperature of about 2750° F., at which sintering takes place. Alternately burned clay material, such as fire brick, either used or new, may be employed. Either of these materials or a mixture of the two may be crushed or otherwise reduced in size to break the same into relatively small particles. The broken material is then screened by passing the same through a 14 mesh per inch screen and upon a 30 mesh screen. The material retained upon the 30 mesh screen is used when tile or an equivalent article is desired having a permeability of about 40 cubic feet of air per minute through one square foot of dry tile approximately one inch in thickness, the air being at a pressure of two inches of water.

Eighty pounds of this crushed and screened material is then mixed with 10 pounds of pulverized plastic clay and 10 pounds of commercial litharge, which is a mixture of orange and yellow lead oxides. Other forms of litharge or lead oxide may, however, be used without changing materially the nature of the resulting article.

To this mixture are added 25 pounds of an aqueous solution containing 2 pounds of air hardening organic bond such as a dextrin or material sold under the trade name of "Goulac," and the mass is thoroughly mixed and aged for a few hours. The material is then weighed or measured into a mold and compressed at a pressure of about 75 to 100 tons per square foot. The shapes are dried at a temperature of about 175° F. and are then loaded into a kiln and are supported on flat refractory slabs and fired on a gradient temperature up to about 2250° F. This temperature is maintained in the kiln for about six hours and the kiln is then cooled down gradually over a period of about forty-eight hours to about room temperature. The articles are then ready for use.

Articles made in accordance with this invention have the advantage that they are relatively inexpensive to make for the reason that the materials used are not expensive. The articles are also slightly more resistant to attack by acids than corresponding articles of fused alumina as heretofore made. The resistance to attack by acids is particularly noticeable when the flux used is in the form of a lead oxide.

The materials also have the advantage that it is easier to remove carbonaceous materials therefrom in burning off with a torch, since these articles are more resistant to cracking or spalling than fused alumina tile. The articles are also somewhat lighter in weight than similar articles made of fused alumina.

My improved process also has the advantage that by firing the articles at lower temperatures than heretofore used in making similar articles, a material saving in the cost of producing the articles results. This saving is due not only to the saving in fuel, but mainly to the fact that by burning at lower temperatures, the percentage of articles spoiled or damaged during the burning is greatly reduced, as well as damage to the kiln and supporting slabs used. At these lower temperatures deformation of the articles while being burned is avoided, as well as failure of the slabs or other supports on which the articles rest while being burned, which failure also generally results in deformation of or otherwise spoiling the articles.

I claim as my invention:

1. A porous permeable ceramic article, including granules of a sintered and crushed aluminum silicate material comprising hard dense granules and screened to pass through an approximately 14 mesh screen and to be retained on an approximately 30 mesh screen, and a bond constituting not more than one-fifth of the weight of the finished article and including approximately equal parts of a silicious material and litharge, said bond having a fusing point below the sintering temperature of said aluminum silicate material and forming vitrified envelopes of the bonding material about the particles of said sintered material and a bond between such particles.

2. A process of making a permeable clay body, comprising burning a body of aluminum silicate material at a temperature of about 2750° F., reducing the burned material to the desired grain size and removing larger and smaller sizes, mixing the resulting grain with a quantity of a bonding material containing clay and a metallic oxide flux which has a fusing point substantially less than 2750° F. and which is insufficient to fill the spaces between said grains, and heating the resulting mixture materially below 2750° F. to glassify said bonding material and to cause the same to envelope the particles of said burnt material and to form throughout the body interconnecting pores between the particles of said burnt material, through which water and air can flow in minute streams.

3. A process of making a permeable clay body, which includes crushing a hard dense sintered aluminum silicate material, screening the crushed material to eliminate material which does not pass through an approximately 14 mesh screen and material which passes through an approximately 30 mesh screen, making a plastic mass of the material retained on said 30 mesh screen, with a bond comprising approximately equal parts of a ball clay and litharge and having a fusing point below the sintering point of said granules, forming the resulting plastic mass into articles of the desired shape, and heating the articles to a temperature not materially above that at which said bond becomes vitrified and below the temperature at which said aluminum silicate material was sintered.

4. A bonded porous permeable ceramic body having as its basic component a hard dense sintered aluminum silicate material in the form of grains free from fine dust-like particles, and a materially smaller quantity of a vitrified bond comprising a mixture of a clay and lead oxide and having a fusing point below the sintering temperature of said aluminum silicate material, said bond securing said grains together to form an open porous structure throughout the body in which most of the spaces between grains communicate with each other to permit fluids to pass readily through the body in finely divided streams, said bond forming glassy envelopes encasing said grains.

5. A porous permeable ceramic article, including granules of a sintered and crushed aluminum silicate material comprising hard dense granules and screened to eliminate coarse and very fine particles, and a bond constituting not more than one-fifth of the weight of the finished article, and including a clay and a flux having a fusing point less than the sintering temperature of said aluminum silicate material, and forming vitrified envelopes about the particles of sintered material and bonding the particles together with most of the spaces between the particles intercommunicating to form an article through which fluids readily pass in finely divided streams.

6. A porous permeable ceramic article, including granules of a sintered and crushed aluminum silicate material comprising hard dense granules and screened to pass through an approximately 14 mesh screen and to be retained on an approximately 30 mesh screen, and a bond constituting not more than one-fifth of the weight of the finished article and including a plastic clay and a flux having a fusing point less than the sintering temperature of said aluminum silicate material, and forming vitrified envelopes about the particles of said sintered material and a bond between such particles, said article having intercommunicating spaces between the particles of sintered material to permit fluids to pass readily through the article.

7. A process of making a porous clay body having intercommunicating pores through which a fluid may pass in a plurality of finely divided streams, comprising reducing a hard, dense, burned aluminum silicate material to the desired grain size and removing all of the larger and smaller sizes, mixing said burned material with not more than one-fifth by weight of a bonding material, including a plastic clay, forming the resulting mixture into the desired shapes, and heating the shaped bodies to a temperature at which the bonding clay becomes vitrified and below that at which said burned material becomes sintered.

8. A process in accordance with claim 7 characterized in that a metallic oxide flux is included in the bonding material to lower the vitrifying temperature of the bonding material below the sintering temperature of said aluminum silicate material.

GRANT S. DIAMOND.